United States Patent [19]

Fiala

[11] 4,106,818
[45] Aug. 15, 1978

[54] BRAKING SYSTEM FOR VEHICLE

[75] Inventor: George T. Fiala, Geneseo, Ill.

[73] Assignee: J. I. Case Company, Racine, Wis.

[21] Appl. No.: 801,148

[22] Filed: May 27, 1977

[51] Int. Cl.² .................. B60T 13/18; 60 547;548;555
[52] U.S. Cl. ........................................ 303/11; 60/548
[58] Field of Search ................... 303/11, 10, 2, 6 R;
60/555; 91/412, 460

[56] References Cited

PUBLICATIONS

Section 151 of J. I. Case Co. Service Manual No. 970-1070, "How It Works–Power Steering and Power Brakes", Jun. 1970.

*Primary Examiner*—Trygve M. Blix
*Assistant Examiner*—Reinhard J. Eisenzopf
*Attorney, Agent, or Firm*—Dressler, Goldsmith, Clement, Gordon & Shore, Ltd.

[57] ABSTRACT

A powered assist braking system having a pressurized fluid source which also supplies fluid to the steering system of a vehicle is disclosed herein. The braking system includes left and right-hand brake actuators that cooperate with a power brake valve and the actuators are designed so that when actuated, hydraulic fluid is trapped in a chamber and this fluid is supplied to actuate the brake while the pressurized fluid source assists in pressurizing the trapped fluid. The power brake valve has a pressure release assembly incorporated therein which controls the maximum pressure of the inlet fluid and also controls the flow of fluid to the steering system. The system also is designed to equalize the pressure of the fluid when both brakes are simultaneously actuated.

6 Claims, 4 Drawing Figures

4,106,818

BRAKING SYSTEM FOR VEHICLE

BACKGROUND OF THE INVENTION

The present invention relates generally to braking systems and more particularly to braking systems for heavy duty vehicles, such as agricultural tractors. Because of the size of these vehicles, it has become customary to provide some type of power braking system so that a large braking force can be applied to a given wheel.

One of the more recent developments in braking systems for such vehicles is what is known as a power assist system wherein the braking pressure of the fluid received by the brake is greater than the inlet pressure of the fluid from the source. This type of system is presently incorporated into agricultural tractors manufactured by the assignee of the present invention.

Because of the numerous hydraulic systems associated with vehicles of this type, it becomes necessary for a single source of pressurized fluid to be utilized for supplying the fluid to various hydraulic systems. For example, in the hydraulic system incorporated into existing agricultural tractors the same pressurized fluid source supplies fluid to the hydraulically actuated brake as well as the hydraulic steering system for the vehicle and, in some instances, may also supply fluid to other hydraulic circuits, such as the transmission.

When more than one system is supplied with hydraulic fluid from a single source, there is usually some type of priority mechanism incorporated into the system to insure that one of the hydraulic circuits receives pressurized fluid whenever necessary. While the amount of fluid that is needed for actuating a hydraulic brake is small, it is absolutely essential that such fluid be available whenever necessary and that fluid also be available for the steering system, if both circuits have a common fluid source.

SUMMARY OF THE INVENTION

According to the present invention, a pressurized fluid source supplies fluid to left and right-hand brake actuating mechanisms as well as the power steering system for a vehicle. The system incorporates a pressure release assembly which maintains a predetermined maximum pressure of the fluid to the brake actuating mechanisms while still allowing for any excess fluid to be utilized for the steering system.

More specifically, the present invention includes brake actuating means having a pressurized fluid source connected thereto through a first conduit and the brake actuating means is connected to a reservoir through a second conduit. The pressurized fluid source is also connected to an auxiliary fluid actuated mechanism with a pressure regulating valve means between the source, the brake actuating means and the auxiliary fluid actuated mechanism. A third conduit connects the brake actuating means to the pressure regulating valve means and the brake actuating means incorporates elements that define two chambers which respectively form part of the first and third conduits and the valve elements are designed so that fluid is trapped in one of the chambers when the brake actuating mechanism is engaged while the second chamber is pressurized with the inlet pressurized fluid source so that the pressure of the fluid acting on the brake is greater than the inlet fluid pressure.

The pressure regulating valve means incorporates a pressure release assembly that is slidable in a valve bore and has one end in communication with the pressurized fluid source and the opposite end in communication with one of the chambers in the brake actuating means through the third conduit. The pressure release assembly also has orifice means that is in communication with the source and a pilot release valve that is in communication with the orifice means. The pressure regulating valve means is assembled so that the pilot valve regulates the pressure of the fluid to the brake actuating means while the pressure release assembly controls the flow of fluid to the auxiliary fluid actuated device throughout the pressure range of the pressurized fluid source.

The braking system and more specifically the power brake valve also has a second brake actuating mechanism associated therewith and the pressure regulating valve means has a balancing system associated therewith so that equal braking pressure is applied to both brakes when both brake actuating means are operated.

DETAILED DESCRIPTION

Figure 1:
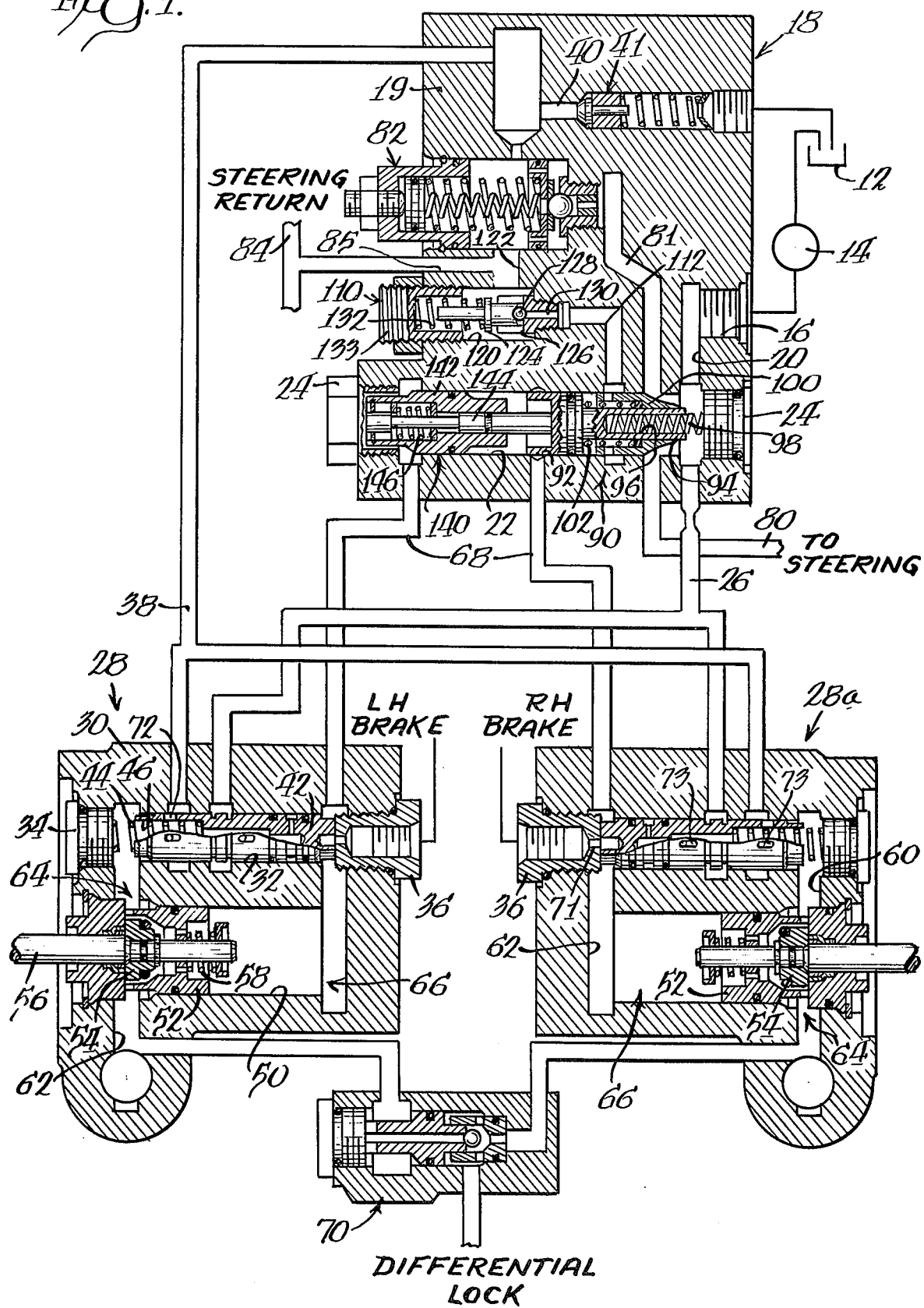
FIG. 1 is a schematic illustration of the hydraulic system with the valves being shown in cross section.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings shows a hydraulic system generally designated by the reference numeral 10 which has pressurized fluid supplied thereto from a reservoir 12 through a pump 14. Pump 14 is connected to an inlet port 16 of a power brake valve 18. Power brake valve 18 consists of a housing 19 that has a passage 20 defined therein, which is in communication with inlet port 16, and an elongated valve bore 22 extending through the housing across passage 20. Valve bore 22 is closed at opposite ends through plugs 24. Passage 20 forms part of a conduit 26 which is connected to left and right-hand brake actuating mechanisms 28 and 28a. Since the left and right-hand brake actuating mechanisms or means are identical in construction only one will be described in detail.

Each brake actuating means includes a housing 30 which has an elongated bore 32 therein that is closed at opposite ends through plugs 34 and 36. The inlet pressure conduit or first conduit 26 is connected to the bore while a second conduit 38 is also in communication with bore 32 and is connected to reservoir 12 through a bore 40 in brake valve housing 19. Bore 40 may have a low pressure relief valve 41 therein to maintain a minimum pressure on the hydraulic fluid in the system.

Valve bore 32 has a brake valve boost spool 42 slidable therein and spool 42 is biased towards plug 36 through a spring 44 that has one end in engagement with plug 34 and the opposite end received into a counterbore 46. Housing 30 also has a second valve bore 50 which has a piston 52 slidable therein and a piston valve 54 with a piston rod or actuator shaft 56 connected to piston valve 54. A spring 58 is interposed between shaft 56 and piston 52 to maintain piston 52 and piston valve 54 in the position illustrated in FIG. 1 when no external force is applied to shaft 56.

The opposite ends of bores 32 and 50 are interconnected through passages 60 and 62 and respectively define first and second chambers 64 and 66 on opposite sides of piston 52. Chamber 66 is connected to valve bore 22 of brake valve 18 through a third conduit 68, while chamber 64 is connected to a differential lock 70, for a purpose that will be described later. Chamber 66 is also connected to the associated hydraulically actuated brake through a reduced opening 71 in plug 36.

Referring now to the brake valve boost spool 42, this spool has openings 72 which place the second or return conduit 38 in communication with counterbore 46 when the actuating means is in an inoperative position so that chamber 64 is in communication with reservoir 12. Chamber 64 is also in communication with chamber 66 through a spacing that is defined between piston 52 and piston valve 54 when the brake actuating mechanism is in an inoperative position. Thus, the hydraulic brake is connected to the reservoir through chambers 66 and 64, openings 72, and conduit 38. Brake valve boost spool 42 has a further set of openings 73 placing counterbore 46 in communication with the external surface of spool 42 and these openings are blocked when openings 72 are in communication with conduit 38.

Returning now to the power brake valve 18, housing 19 has a steering conduit 80 which is in communication with a passage 81 that intersects bore 22 adjacent passage 20. Thus, conduit 80 is also connected to reservoir 12 through a main pressure relief valve 82 while the steering return conduit 84 is also in communication with reservoir 12 through a passage 85 and the bore that forms part of the main pressure relief valve.

Figure 4:
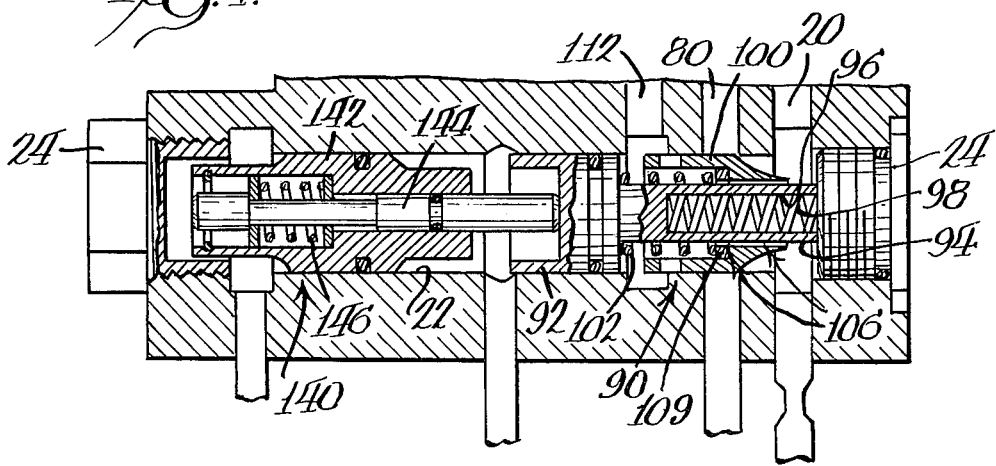
FIG. 4 is an enlarged fragmentary view of the pressure release assembly.

According to the main aspect of the present invention, power brake valve or pressure regulating valve means 18 has a pressure release assembly 90 located within valve bore 22 which controls the flow of fluid to the steering system or steering conduit 80 and also controls the pressure of the fluid that is delivered to left and right-hand brake actuating means 28 and 28a through conduit 26. More specifically, pressure release assembly 90 (FIG. 4) consists of a piston 92 that is slidable in bore 22 and piston 92 has a reduced portion 94 extending from one end thereof toward inlet passage 20. Reduced portion 94 has an internal opening 96 which receives a spring 98 that biases piston 92 away from inlet passage 20. Pressure release assembly 90 also includes a pressure release spool or sleeve 100 which is slidably supported on reduced portion 94 with a biasing spring 102 interposed between piston 92 and sleeve 100.

According to one aspect of the invention, reduced portion 94 of piston 92 and sleeve 100 cooperate to define orifice means 106 between inlet bore 20 and a pilot valve means 110 in communication with valve bore 22 through a port or opening 112 in housing 19. In the specific embodiment illustrated, orifice means 106 is produced by making the internal diameter of circular sleeve 100 slightly larger than the external diameter of circular reduced portion 94 so that pilot valve means 110 is at all times in communication with inlet bore 20.

More specifically, orifice means 106 is produced between an inner edge of a washer 109, which may be considered part of sleeve 100, and the periphery of reduced portion 92. This will provide more accurate control over the size of the orifice.

Pilot valve 110 includes a valve bore 120 (FIG. 1) which is in communication with reservoir 12 through a passage 122. A valve stem 124 is slidably received into an end portion of a pilot sleeve 126 with a ball 128 cooperating with an orifice opening 130 in sleeve 126. Valve stem 124 is biased towards sleeve 126 through a spring 132 and the force applied by spring 132 will, therefore, determine the pressure at which ball 128 will be moved.

Before describing the operation of the hydraulic system, another aspect of the invention will now be described. As indicated above, the hydraulic system of the present invention also has means for balancing the pressure of fluid delivered to the left-hand and right-hand brakes when both brakes are simultaneously actuated. This is accomplished with a simple balancing spool that is properly positioned within brake valve or pressure regulating valve means 18. More specifically, valve bore 22 has a balancing piston 140 slidably received therein and the balancing piston is located between the respective third conduits 68 respectively leading from the left-hand brake actuating mechanism 28 and the right-hand brake actuating mechanism 28a. Balancing piston 140 consists of a valve element 142 that slidably receives a valve stem 144 with a spring 146 located between valve element 142 and stem 144.

Considering now the operation of the unique hydraulic circuit, when both brake actuating means are in an inoperative position, as illustrated in FIG. 1, biasing spring 98 biases pressure release piston 92 towards the left so that the left-hand end thereof is in engagement with valve stem 144 while valve stem 144 is in engagement with plug 24. In this position, the biasing spring 102 acts on one end of sleeve 100 while the pressure of the fluid from source 14 acts on the opposite end of sleeve 100. Since the force of spring 102 is substantially less than the force of the pressurized fluid from pump 14, sleeve 100 is moved to the left to develop substantially unrestricted flow from inlet port 16 to steering conduit 80 and the fluid is at low pressure.

Figure 2:
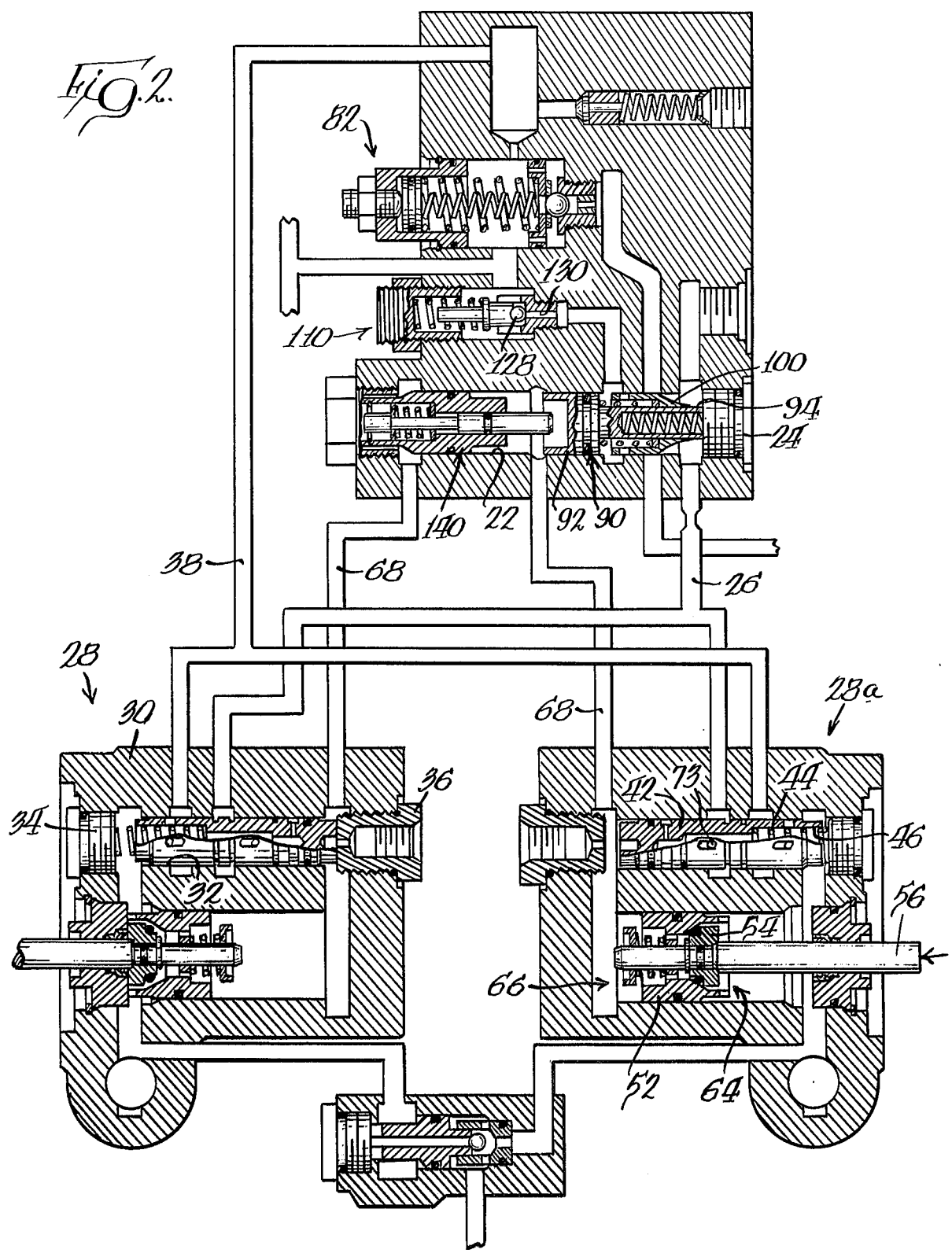
FIG. 2 is a view similar to FIG. 1 showing the system with one brake being actuated.

When one of the brake actuating means is operated, such as the right-hand brake actuating means 28a, by applying an external force to piston rod or shaft 56, the initial movement of shaft 56 will move piston valve 54 into engagement with piston 52 to isolate chambers 64 and 66 from each other. The force applied to shaft 56 pressurizes the fluid in chamber 66 and the pressure of this fluid overcomes the bias of spring 44 to move brake valve boost spool 42 to the right as viewed in FIG. 2. This movement to the right blocks the flow through return conduit 38 to trap the fluid in chamber 66. Movement of spool 42 to the right places inlet conduit 26 in communication with chamber 64 through openings 73 and counterbore 46 so that the pressure of the fluid from pump 14 acts on piston 52 along with the external force that is applied to shaft 56 by the operator. The inlet fluid in chamber 64 is also delivered to differential lock valve 70 so that the differential is locked as is well known in the art.

The trapped fluid in chamber 66, which is supplied to the brake, is therefore at a higher pressure than the fluid from pump 14. The trapped pressurized fluid in chamber 66 also acts on the left-hand end of piston 92 through conduit 68, and since this pressure is higher than the inlet pressure, it will move the entire pressure release assembly 90 to the right and force reduced portion 94 into engagement with plug 24. The movement of pressure release assembly 90 to the right will substantially restrict the flow to steering conduit 80 so that there will be an immediate pressure buildup of the fluid delivered by pump 14 which will rapidly increase the pressure of the trapped fluid and increase the braking force. This rapid buildup of the pressure of the fluid from pump 14 will also act on the right-hand end of sleeve 100 and, since the force applied to the left-hand end of sleeve 100 by spring 102 is substantially less than the force applied to the right-hand end of the sleeve from the pressure of the inlet fluid, will immediately move sleeve 100 to the left to provide increased flow from the inlet port to steering conduit 80 so that pressurized fluid is available to perform the steering function.

A small amount of the high pressure fluid passes orifice means 106 which causes a buildup of the pressure of the fluid in passage 112 and thus increases the force applied to the left side of release spool or sleeve 100. When the inlet pressure exceeds the desired pressure limit, determined by the setting of pilot valve 110, ball 128 will be moved away from orifice 130 to maintain the pressure at a regulated level on the left side of sleeve 100. Since the inlet pressure of the fluid from pump 14 is always slightly greater than the regulated pressure, the differential in pressure on opposite sides of the sleeve balances sleeve 100 against the force of spring 102 and, therefore, maintains a restricted opening between inlet passage 20 and steering conduit 80.

Of course, all the above movement occurs in a very short time span so that there is pressurized fluid available for performing the steering function. If there is a rapid buildup of pressure of the inlet fluid beyond the regulated setting, main relief valve 82, which has a higher setting than regulating valve or pilot valve means 110, will open to reduce the pressure of the inlet fluid.

The significant feature of the present arrangement described above, is that the position of sleeve 100 is totally independent of the pressure of fluid which is utilized for actuating the brake. In other words, an increase in the input force on shaft 56 will likewise increase the pressure of the trapped fluid in chamber 66 to the right-hand brake and on the left-hand end of piston 92 but this increased pressure will have no affect on the movement of sleeve 100 since piston 92 is already in engagement with plug 24.

The same condition would occur if left-hand brake actuating mechanism 28 were operated while the right-hand brake actuating mechanism 28a were inoperative. Under this condition, the pressure of the fluid in conduit 68 will move the entire balancing piston 140 to the right, as viewed in FIG. 1 and the stem 144 will, therefore, force the piston 92 to the right into engagement with plug 24. However, the pressure regulating and flow control operation of pressure release assembly 90 will be the same as described above.

Figure 3:
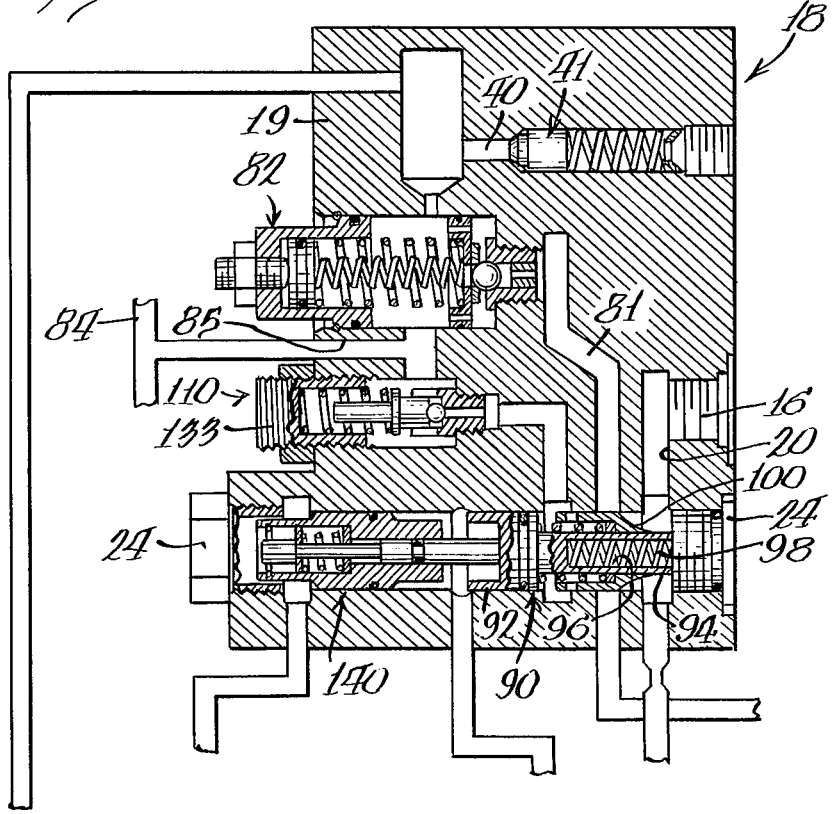
FIG. 3 is a view similar to FIG. 1 showing the system when both brakes are actuated.

FIG. 3 illustrates the condition of power brake valve 18 when both the left and right-hand brake actuating means are simultaneously operated. Since the two conduits 68 from the respective actuating means are in communication with bore 22 on opposite sides of balancing piston 140, the position of the balancing piston with respect to the bore 22 will be dependent upon the pressure of the fluid in the respective braking circuits. For example, if the pressure were not equal, the piston 140 would move in the appropriate direction to balance the pressure in both conduits 68 so that the pressure that is applied to the respective brakes is at all times equal when both brakes are applied. This feature is of substantial significance since it insures equal braking force at all times when both brakes are simultaneously actuated.

From the description, it will be appreciated that the present invention provides a unique arrangement wherein the pressure of the fluid for actuating the respective brakes can readily be controlled by making the desired setting for pilot valve 110, which is readily adjustable by movement of threaded plug 133.

What is claimed is:

1. In a braking system for a vehicle including a reservoir; a pressurized fluid source; a fluid actuated brake; brake actuating means having a first conduit connected to said source and a second conduit connected to said reservoir; an auxiliary fluid actuated mechanism connected to said first conduit, and pressure regulating valve means in said first conduit for controlling flow of fluid to said auxiliary fluid actuating mechanism and the pressure of fluid flowing from said source to said brake actuating means with said brake actuating means having a third conduit connected to said pressure regulating valve means, said brake actuating means having movable valve elements defining first and second chambers, said first chamber being in communication with said third conduit and said fluid actuated brake, said movable valve elements having a first position placing said chambers in communication with each other and with said second conduit while blocking flow from said first conduit and a second position placing said first conduit in communication with said second chamber and blocking flow between said second conduit and both chambers, the improvement of said pressure regulating valve means having a valve bore with said first conduit in communication with one end of said bore and said auxiliary fluid actuated mechanism in communication with said bore adjacent said first conduit, a pressure release assembly slidable in said bore and having one end in communication with source and an opposite end in communication with said third conduit, orifice means in said pressure release assembly and in communication with said source, and pilot valve means in communication with said bore and said orifice means so that said pressure release assembly and pilot valve means regulate the pressure of fluid to said brake actuating means and regulate flow of fluid to said auxiliary fluid actuated device at any pressure of said pressurized fluid source.

2. A braking system as defined in claim 1, in which said pressure release assembly includes a piston slidable in said bore and having one end in communication with said first conduit and said opposite end in communication with said third conduit so that said piston is positioned as a function of the pressure of the fluid in said first and third conduits.

3. A braking system as defined in claim 2, in which said piston has a reduced portion on said one end and said pressure release assembly further includes a sleeve slidable on said reduced portion and controlling flow of fluid between said source and said auxiliary fluid actuated device.

4. A braking system as defined in claim 3, in which said pressure release assembly includes biasing means between said piston and said sleeve which biases said sleeve toward said first conduit and in which said pilot valve means is in communication with said bore between said piston and said sleeve.

5. A braking system as defined in claim 4, in which said reduced portion and sleeve are circular further including a washer movable with said sleeve and in which the external diameter of said reduced portion is slightly less than the internal diameter of said washer to define said orifice means.

6. A braking system as defined in claim 1, further including a second fluid actuated brake and brake actuating mechanism as defined in claim 1, with said first and second conduits connected thereto and a third conduit of said second brake actuating mechanism communicating with said bore at a location spaced from said third conduit of the first brake actuating mechanism, and a balancing spool in said bore between said third conduits and cooperating with said pressure release assembly, said balancing spool balancing the pressure in said third conduits when both said brake actuating mechanisms are simultaneously actuated.

* * * * *